United States Patent [19]

Kimura et al.

[11] Patent Number: 4,512,557
[45] Date of Patent: Apr. 23, 1985

[54] APPARATUS FOR PREPARING HIGH-MELTING-POINT HIGH-TOUGHNESS METALS

[75] Inventors: Etsuji Kimura; Katsumi Ogi; Kazusuke Sato, all of Saitama; Mayuki Hashimoto, Tokyo, all of Japan

[73] Assignee: Mitsubishi Kinzoku Kabushiki Kaisha, Tokyo, Japan

[21] Appl. No.: 511,934

[22] Filed: Jul. 8, 1983

[30] Foreign Application Priority Data

Jul. 21, 1982 [JP] Japan .................... 57-125870
Mar. 4, 1983 [JP] Japan .................... 58-034488

[51] Int. Cl.³ ............................................. C22B 53/00
[52] U.S. Cl. ...................................... 266/171; 266/905
[58] Field of Search ............... 266/905, 168, 149, 171, 266/207, 208; 75/84.5, 84

[56] References Cited

U.S. PATENT DOCUMENTS 2,756,043  7/1956  Fleiszar et al. ................. 266/905
3,071,459  1/1963  Elger et al. ....................... 75/84.5
3,684,264  8/1972  Petrov et al. ..................... 266/905
3,715,205  2/1973  Ishizuka .......................... 266/905

FOREIGN PATENT DOCUMENTS 18717  9/1972  Japan .

Primary Examiner—L. Dewayne Rutledge
Assistant Examiner—S. Kastler
Attorney, Agent, or Firm—Oblon, Fisher, Spivak, McClelland & Maier

[57] ABSTRACT

An improved apparatus for preparation of high-melting-point high-toughness metals comprising a reaction chamber in which a halide of said metal is reacted with an active metal and the remaining active metal and the produced active metal halide are vaporized and a condensation chamber in which vapors of the remaining active metal and the active metal halide are condensed is disclosed. The apparatus comprises a reaction chamber and a condensation chamber as described above both of which are provided with a neck having a passage-closing means of the seal pot structure, and the two chambers are placed in parallel in the upright position and are connected with a horizontal connecting duct.

14 Claims, 10 Drawing Figures

Fig. IA  Fig. IB  Fig. IC
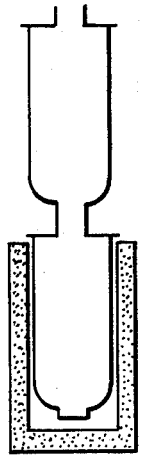
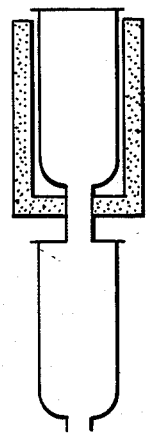
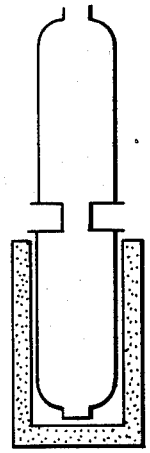
Fig. ID  Fig. IE
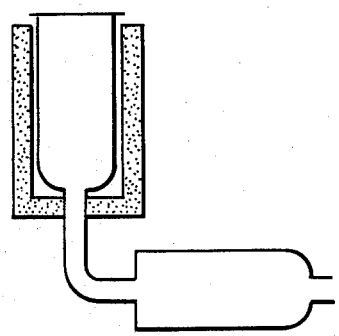
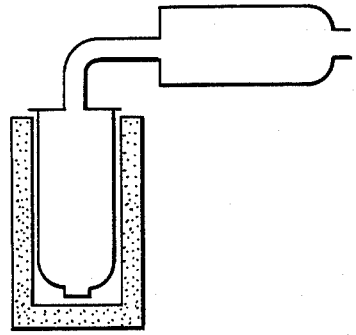

APPARATUS FOR PREPARING HIGH-MELTING-POINT HIGH-TOUGHNESS METALS

TECHNICAL FIELD OF THE INVENTION

This invention relates to an apparatus for reduction of metal halides. Among metallic materials, titanium and zirconium, which have high melting point and high toughness, are mainly produced by reduction of their chlorides with magnesium and are obtained in the form of a spongy mass. This invention is directed to improvement of an apparatus for reduction of such metal halides. In this specification, the term "high-melting-point high-toughness metal" is used as a generic designation of a group including titanium, zirconium and possibly hafnium.

BACKGROUND OF THE INVENTION

Preparation of the sponge of these high-melting-point high-toughness metals was formerly effected by using a separate apparatus respectively in the reduction step and the step of separation of the formed metal (vacuum distillation and condensation of the by-product). An apparatus combining the reduction chamber and the separation chamber was disclosed in Japanese Published Patent Publication No. 18717/72. Various improvements in such an integrated apparatus are disclosed in Japanese Published Patent Laying-Open Patent Publication No. 49922/77, etc.

All the known integrated apparatuses comprise a reaction (reduction) chamber and a condensation chamber located immediately thereabove, and all the improvements relate to the construction of the connecting part between the two chambers and the means for shutting off the connecting part. The apparatus of the copending application No. 485,057 now U.S. Pat. No. 4,470,045 has a connecting part which is shut off by a seal pot filled with a fusible and volatile material. With this arrangement, the two chambers can easily be separated even when the reaction chamber is still hot, so the reaction chamber can be removed from the heating furnace. Also this apparatus is advantageous in that the same container can be used as the reaction chamber as well as the condensation chamber.

In this apparatus, however, the produced spongy metal, from which the by-product has been removed, is taken out from the reaction chamber by tilting or turning the reaction chamber upside down. Also when a chamber is interchangeably used as the reaction chamber and the condensation chamber, a chamber which has been used as the reaction chamber must be turned upside-down by 180° in order to be used as the condensation chamber. This is a significant inconvenience when larger capacity apparatuses are required.

When two chambers of the same shape are used as the reaction chamber and the condensation chamber, six kinds of arrangement of the two chambers are conceivable: a vertical arrangement of an upright reaction chamber and an upright condensation chamber placed right above the former; a vertical arrangement of an upright reaction chamber and an upright condensation chamber placed right under the former; a vertical arrangement of an upright reaction chamber and an inverted condensation chamber placed right above the former; a right angle arrangement of an upright reaction chamber and a horizontally positioned condensation chamber placed under the former and connected with an elbow connector crooked at 90°; a right angle arrangement of an upright reaction chamber and a horizontally positioned condensation chamber placed above the former and connected with an elbow connector crooked at 90°; and a parallel vertical arrangement of an upright reaction chamber and an upright condensation chamber.

Of these six arrangements, the third arrangement was employed in the apparatus of the copending application No. 511,934. So the first and the second arrangements are regarded as modifications of the invention of said application.

This invention provides an improved apparatus for preparation of high-melting-point high-toughness metals employing the above-mentioned last arrangement whereby the above-mentioned disadvantage of the prior art apparatuses is eliminated.

DISCLOSURE OF THE INVENTION

This invention is in an apparatus for preparing a high-melting-point high-toughness metal comprising in an apparatus for preparation of high-melting-point high-toughness metals by reduction of halide thereof with an active metal which comprises a heatable reaction chamber in which a metal halide and an active metal are reacted, and the remaining active metal and produced active metal halide are vaporized; a coolable condensation chamber in which vapors of the remaining active metal and produced active metal halide are collected and condensed; and a gas passage connecting the two chambers, the whole apparatus being evacuable: an improved apparatus in which the reaction chamber and the condensation chamber are placed in parallel in the upright position; each chamber has a lid with a neck which is provided with a seal pot comprising a funnel member and a pan member receiving the lower pipe of the former and a heating means for heating the neck; and the necks of the two chambers are communicated with a detachable connecting duct provided with a heating means.

The apparatus of this invention is applied to preparation of titanium and zirconium by reduction of a chloride thereof with magnesium for today. The fusible and volatile material used for the seal pot is magnesium or magnesium chloride.

The apparatus of this invention is advantageous in that the condensation chamber need not be tilted or turned upside down. Operation efficiency can be enhanced by using a chamber alternately as the reaction chamber and the condensation chamber, whereby wear and tear of parts can be equalized.

BRIEF DESCRIPTION OF THE DRAWINGS

FIGS. 1A, 1B, 1C, 1D and 1E show the arrangements of the reaction chamber and the condensation chamber as mentioned above.

FIG. 4 is an elevational cross-section of one embodiment of the seal pot. FIG. 5 is a plan view of the embodiment of FIG. 4. FIG. 6 is an elevational cross-section of another embodiment of the seal pot.

DESCRIPTION OF THE PREFERRED EMBODIMENTS

The fundamental construction and function of the apparatus of this invention are explained below with respect to the preparation of titanium metal.

Figure 2:
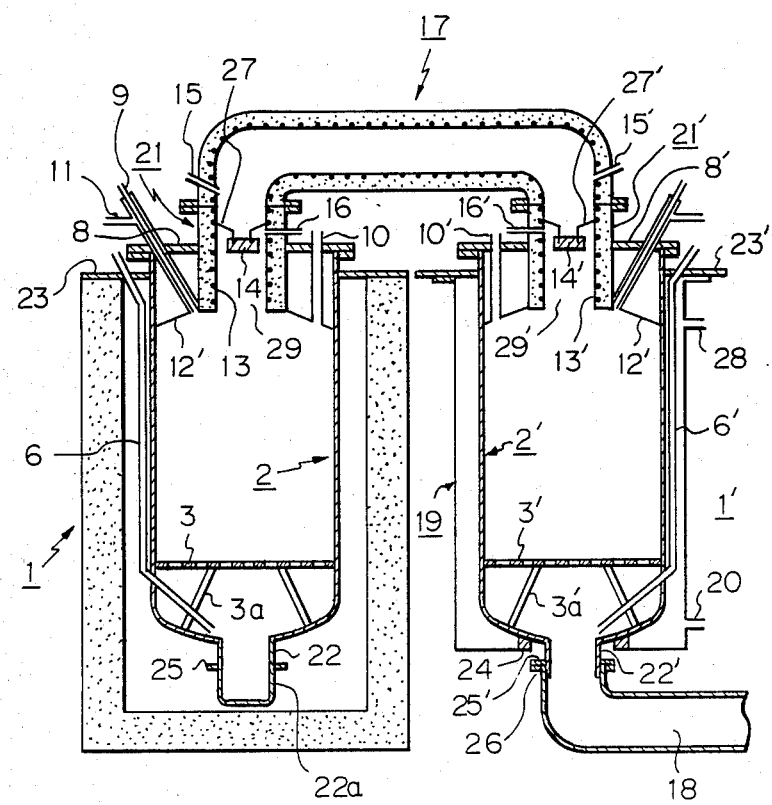
FIG. 2 is a schematic elevational cross-section of an embodiment of the invention of this application.

The apparatus of FIG. 2 comprises a reaction chamber 2 and a condensation chamber 2', which are cylindrical bodies of the same shape and stand upright in parallel. The reaction chamber is placed in a heating furnace 1 and the condensation chamber is placed in a cooling jacket 19. The opening of each chamber is closed by a neck (gas passage) 21, 21', which is combined with a lid 8, 8'. The two necks are connected by a horizontally long U-shape connecting duct 17.

As mentioned above, the reaction chamber and the condensation chamber are of the same shape and the same structure, and therefore only the reaction chamber will be described in detail below. Parts of the condensation chamber are shown by the same reference number as those of the reaction chamber but with a prime mark. The explanation on the reaction chamber applies to the condensation chamber as is.

Toward the bottom of the reaction chamber 2 is placed a grating 3 with supports 3a. A tube 6 for drawing out the produced by-product $MgCl_2$ is provided so as to open toward the bottom of the reaction chamber. This tube rises along the wall of the reaction chamber and fixed to the brim 23 of the reaction chamber.

At the center of the bottom thereof the reaction chamber is provided with a closed cylindrical protrusion 22 with a brim 25. When the produced metal sponge is taken out after the reaction and the separation of the formed $MgCl_2$ has been finished, the end portion of the protrusion is cut off and is opened. The brim 25 is used for connecting an evacuating tube 18 which is explained later. When the chamber is used as a condensation chamber, it is used with the protrusion 22 open. The upper opening of the reaction chamber is closed with the lid 8 which is integrated with the neck 21. The neck 21 is a short double-wall tube provided with an electric resistance heating means 13. The neck is further provided with a seal pot 14.

The principle of the seal pot per se is well known. A pan 14 is supported in the middle of the gas passage (the supporting means is not shown in the drawing). A funnel body 27 is provided so that the lower pipe thereof protrudes into the pan 14. A fusible and volatile material, magnesium for instance, is introduced into the pan 14 via the funnel 27 from an inlet tube 15, which is explained in detail later, and solidified so as to close the passage. When the passage is to be opened, the material is vaporized by means of the heating means 13.

An umbrella-like baffle board 12 is provided at the lower end of the neck 21 so that its periphery may contact the inside wall of the reaction chamber 2.

A tube 9 for introducing $TiCl_4$, a tube 11 for introducing an inert gas such as Ar (which are shown as a double tube in the drawing) and an inlet duct 10 for Mg 10 are provided to penetrate through the baffle board 12. Further an outlet duct 16 is provided in the neck penetrating therethrough.

The connecting duct 17 is a double-wall U-shaped tube provided with a heating means (usually an electric resistance heating means) over the whole length thereof. Toward both ends thereof the inlets 15 for fusible volatile material are provided.

The periphery of the opening of the reaction chamber 2 has a flange, to which the lid 8 is detachably secured by means of clamps or bolts with a heat-resistive gasket therebetween. Also the upper end of the neck 21 is provided with a flange, to which the corresponding flange of the connecting duct 17 is detachably secured in the same way.

All the above-mentioned ducts and tubes are provided with valves and means for disconnection from the master tubes. These are well known to those skilled in the art and therefore are omitted from the illustration and description.

The heating furnace receiving the reaction chamber is a known one, which is conveniently heated with an electric resistance heating means. The reaction chamber is supported on the upper edge of the furnace by means of the brim 23.

The cooling jacket 19 is a simple container which receives the condensation chamber 2' and has an opening at the bottom thereof inside of which is provided with an annular elastomer gasket 24. The bottom of the condensation chamber 2' sits tightly on this gasket, so that a jacket space is formed between the jacket and the condensation chamber. Of course, the upper edge of the cooling jacket 19 is provided with a flange, to which the lid 8' is secured with a gasket therebetween.

The cylindrical protrusion 22' at the bottom of the condensation chamber (a chamber of the same shape as the reaction chamber) placed in the cooling jacket is open (the end is cut off) and projects from the bottom of the cooling jacket. An evacuation duct 18 is connected to the cylindrical protrusion. The evacuation duct 18 has a larger diameter than the protrusion 22' and the end thereof is also provided with a flange 26, which is secured to the brim of the protrusion 22' in the same way as described above.

Some of the various inlet tubes and the outlet tubes are not used when the chamber is used as a condensation chamber.

When the condensation chamber is used as a reaction chamber in the next operation, the cylindrical protrusion at the bottom is closed by quickly welding a disk of the same size thereto. The opening of the protrusion is closed in this way because a suitable gasket means resistant to high temperature is not available. But if such a suitable gasket material is developed, the opening will be closed by securing the flanges of the two members in the same way as described above. In contrast, the gaskets used for securing the lid 8 to the reaction chamber and for connecting the neck 21 and the connecting duct can be made of fluorine resins, which are cooled if necessary.

The apparatus can be constructed by those skilled in the art on the basis of the general knowledge in chemical engineering with reference to the above description and the attached drawings and prior art references. So we do not explain how to construct the apparatus here.

The dimensions and particulars of an apparatus we constructed on an experimental basis were as follows. The reaction chamber, also usable as a condensation chamber, was of the bell shape 700 mm in outside diameter and 1760 mm in height; the neck (gas passage) was 380 mm in length (height) and 185 mm in inside diameter. The reaction chamber (condensation chamber) and the connecting duct were made of a ferritic chromium stainless steel plate 25 mm in thickness. The seal pot pan was made of 5 mm thick plate of the same material and was 150 mm in outside diameter and 50 mm in height.

The pan was supported by three sticks in the center of the gas passage. The funnel was made of the plate of the same thickness.

The operation of the apparatus is explained below with respect to a working example by which sponge titanium was prepared.

The apparatus was at first assembled as shown in FIG. 2. In this condition, the bottom of the protrusion of the reaction chamber 2 was closed but that of the condensation chamber 2' was open, that is, the end of the cylindrical protrusion 22' was cut off. The seal pot 14 was closed with metallic magnesium, but the seal pot 14' was left open (although it could have been closed). The cut-off cylindrical protrusion 22' at the bottom of the condensation chamber was connected to the evacuation duct 18. When the apparatus is used for the first time, the seal pot 14' is open. However, when the apparatus is used for the second time and later, the reaction chamber and the condensation chamber being interchangeably used, the seal pot 14' (14) is closed all the time.

Before the apparatus was assembled, the reaction chamber 2 had been charged with about 415 kg of Mg. The reaction chamber was tightly closed and evacuated through the duct 11 and thereafter Ar was introduced so that the reaction chamber was completely filled with Ar atmosphere. Then the reaction chamber was heated by means of the heating furnace 1 so as to melt the charged Mg. At 750° C. feeding of $TiCl_4$ was started through the inlet tube 9. The reaction continued for 28 hours until about 1170 kg of TiCl was consumed. Thereafter the reaction chamber was further kept at 900° C. for about 60 minutes, and the produced $MgCl_2$ was then withdrawn through the duct 16 as completely as possible. Then the gas passage 29 and the gas passage 29' and the connecting duct 17 were heated to 750°–800° C. and the apparatus was gradually evacuated through the evacuation duct 18. Needless to say, all the openings communicating to the atmosphere were completely closed at this stage. After the evacuation was started, the gas passage 29 was opened by vaporization of Mg. As the apparatus was evacuated more and more, the Mg trapped in the formed spongy titanium and the formed by-product $MgCl_2$ were vaporized and conveyed through the connecting duct 17 to the condensation chamber, which was cooled with water circulated in the jacket, and condensed and deposited on the wall of the condensation chamber. As the apparatus was further evacuated, the temperature of the furnace was raised to 900°–1000° C. and vacuum separation was continued for a further 25 hours. After the vacuum separation was completed, both the reaction chamber and the condensation chamber were returned to atmospheric pressure by introduction of Ar. Respectively 1.3 kg of Mg at about 750° C. was introduced into each of the pans 14 and 14' and was solidified so as to close the gas passages 29 and 29'. When the temperature of the reaction chamber was lowered to 800° C. or lower, the connecting duct was disconnected. Each opening was tightly closed by securing a lid to the flange of the opening of the neck so that the contents of the chambers were prevented from contact with air and moisture. Thereafter, the reaction chamber was hoisted out of the heating furnace while the chamber was slightly pressurized with Ar, and the reaction chamber was forcibly cooled in a cooling stand not shown in the drawings. After the chamber was cooled, the cylindrical protrusion at the bottom thereof was cut open and about 280 kg of high quality spongy titanium was taken out together with the grating 3 by inserting a pushing rod through the bottom opening. On the other hand, the condensation chamber was disconnected from the evacuation duct 18 after the water had been withdrawn. The opening of the cylindrical protrusion at the bottom was quickly closed by welding a lid thereto while Ar was being supplied into the chamber to prevent the atmospheric air from entering the condensation chamber. Then the condensation chamber was suspended and transferred to the heating furnace 1 and the connecting duct 17 was connected thereto and the entire apparatus was assembled for the next run. Under this condition, both seal pots were closed, therefore, the next run could be immediately started.

As has been described above, a reaction chamber and a condensation chamber are placed in parallel on the same level and the upper openings of the two chambers are connected with a connecting duct. So the apparatus of this invention is advantageous not only in that the condensation chamber need not be turned upside down when the product is taken out but also in that the apparatus as a whole can enjoy the advantage of the apparatus of the copending application No. 511,934.

As a reactor (which means a reaction chamber or a condensation chamber) is used repeatedly, the cylindrical protrusion at the bottom thereof becomes shorter. Therefore the length of the cylindrical protrusion is determined by considering the life (the number of times of use) of the reactor.

Figure 3:
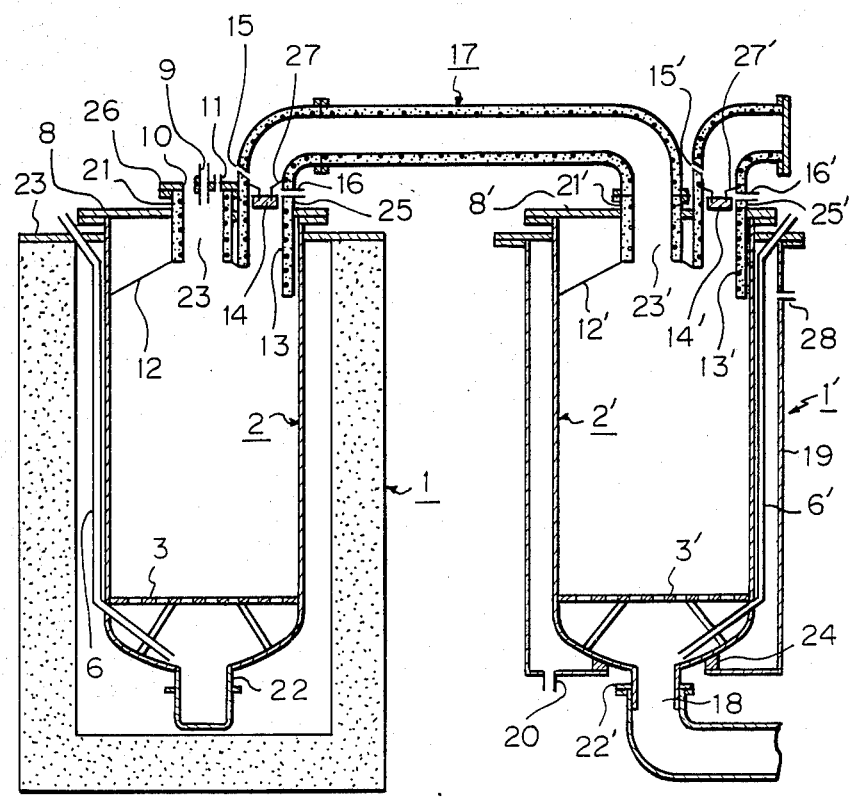
FIG. 3 is a schematic elevational cross-section of another embodiment of the invention of this application.

FIG. 3 represents a modification of the apparatus shown in FIG. 2. In this apparatus, there is only one seal pot in the gas passage between the reaction chamber and the condensation chamber in the assembled condition.

That is to say, two openings 21 (21') and 25 (25') are provided in each reactor. The two openings each have a neck, but the seal pot is provided only in one of them and in the corresponding one of the other reactor (only in 21 and 21' in FIG. 3). (Needless to say, the seal pots can be provided in the openings 25 and 25' instead of 21 and 21'.) The neck (25 for instance) of one reactor in which a seal pot is provided is communicated with the neck (21') of the other reactor in which no seal pot is provided by means of a connecting duct 17. The necks 21, 21' in which no seal pots are provided are closed by a lid 26 when they are not connected to the connecting duct. The inlet and outlet 9, 11 are provided in these parts. Therefore, the structure of the neck is simplified. A lid 26 can be used alternately for the reaction chamber and the condensation chamber. That is, one lid suffices. (There is no member 26'.)

The other parts are entirely the same as the embodiment of FIG. 2, and corresponding parts are indicated with the same reference numbers. Therefore, the structure of the whole apparatus will be understood from the previous description.

Figure 4:
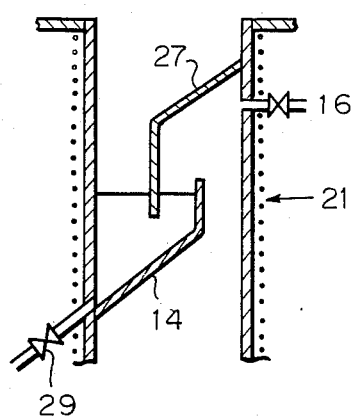
FIGS. 4, 5 and 6 are schematic representations of other embodiments of the seal pot.
Figure 5:
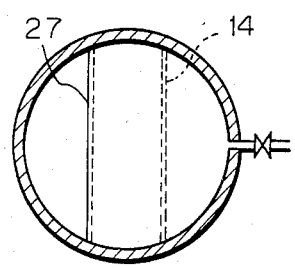
Figure 6:
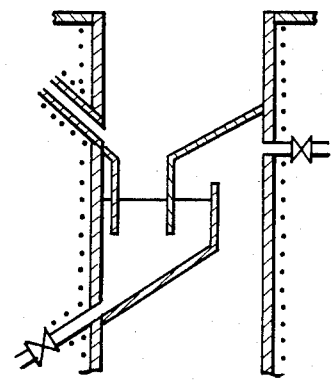

In the apparatus of this invention, a seal pot of another structure can be employed as illustrated in FIGS. 4, 5 and 6. A pan 14 is provided in the neck 25 using a part of the side wall thereof as a part of its own side wall and its lower pipe. A funnel 27 is formed over this pan using a part of the side wall of the neck as a part of its own side wall, too. The lower pipe of the funnel is received in the pan 14. Further, a drain duct 29 is provided at the bottom of the pot 14 so that the melt in the pot can be drained when desired and the inside of the pot can be cleaned. That is, this structure is advantageous in that the removal of the sealing magnesium can be effected by melting, not by vaporizing, which expedites operation and saves some energy. This structure is also advantageous in that the inside wall of the seal pot can be cleaned by inserting something like a ramrod through the duct 29 from the outside. Because sealing with the solidified fusible material gradually becomes imperfect as the operation is repeated. In this sense, the duct is preferably in alignment with the inclined bottom of the funnel as illustrated, although this is not essential, since a ramrod is easily inserted in such a shape.

The funnel can alternatively be constructed in an independent shape as shown in FIG. 6. The funnel is depicted as an eccentric funnel in FIG. 6, but a concentric funnel can, of course, be employed instead, although the eccentric funnel is advantageous in that a shorter neck can be employed.

INDUSTRIAL APPLICABILITY

This invention provides an improved apparatus for reduction of chlorides of high-melting point and high-toughness metals which is more convenient in use than the prior art appartuses. This apparatus is immediately applicable to the manufacturing of titanium and zirconium, and it will be recognized among those skilled in the art that it will also be possible to advantageously employ this apparatus in any future-developed process for preparing a similar metal by reduction of its halide with an active metal, which is not limited to magnesium but may instead be calcium, sodium, etc.

We claim:

1. An apparatus for preparation of high-melting-point high-toughness metals by reduction of halide thereof with an active metal, comprising:
    a heatable reaction chamber in which a metal halide and an active metal are reacted, and the remaining active metal and produced active metal halide are vaporized;
    means for heating said reaction chamber;
    a coolable condensation chamber in which vapors of the remaining active metal and produced active metal halide are collected and condensed;
    means for cooling said condensation chamber; and
    a gas passage connecting the two chambers, the whole apparatus being evacuable, wherein the reaction chamber and the condensation chamber are positioned side-by-side in the upright position, wherein each chamber has a lid with a neck which is provided with a seal pot comprising a funnel member and a pan member receiving the lower pipe of the former and a neck heating means for heating the neck, and wherein the necks of the two chambers are communicated with a detachable connecting duct provided with a duct heating means.

2. An apparatus as recited in claim 1, wherein the reaction chamber and the condensation chamber are of identical shape and size and are used interchangeably.

3. An apparatus as recited in claim 2, wherein both the reaction chamber and the condensation chamber are provided with a closable opening at the bottom thereof.

4. An apparatus as recited in claim 3, wherein the bottom opening is a cylindrical protrusion the end of which can be closed by welding a lid thereon.

5. An apparatus as recited in claim 3, wherein the means for cooling the condensation chamber is a container which can receive the condensation chamber and is provided with an opening at the bottom thereof, said opening being provided with an annular gasket of an elastomeric material so that the bottom of the condensation chamber sit on the gasket with the protrusion protruding out of the opening and a jacket space being formed between the wall of the container and the wall of the condensation chamber.

6. An apparatus as recited in claim 1, wherein the pan of the seal pot is provided with a drain duct with a valve leading outside of the neck.

7. An apparatus as recited in claim 6, wherein the pan of the seal pot is constructed so that a part of the neck wall constitutes a part of the side wall thereof.

8. An apparatus as recited in claim 7, wherein the drain duct is in alignment with an inclined bottom plate of the pan.

9. An apparatus as recited in claim 8, wherein the funnel is also constructed so that a part of the neck wall constitutes a part of the side wall thereof.

10. An apparatus as recited in claim 1, wherein the reaction chamber and the condensation chamber are each provided with two necks, in one of which a seal pot means is provided and the neck of one chamber in which a seal pot means is provided and the neck of the other chamber in which no seal pot means is provided are connected with the connecting duct.

11. An apparatus as recited in claim 10, wherein the pan of the seal pot is provided with a drain duct with a valve leading outside of the neck.

12. An apparatus as recited in claim 11, wherein the pan of the seal pot is constructed so that a part of the neck wall constitutes a part of the side wall thereof.

13. An apparatus as recited in claim 12, wherein the drain duct is in alignment with the inclinated bottom plate of the pan.

14. An apparatus as recited in claim 13, wherein the funnel of the seal pot is also constructed so that a part of the neck wall constitutes a part of the side wall thereof.

* * * * *